(12) United States Patent
Sato

(10) Patent No.: US 9,924,110 B2
(45) Date of Patent: Mar. 20, 2018

(54) ELECTRONIC APPARATUS, STORAGE MEDIUM, AND METHOD FOR DISPLAYING IMAGE

(71) Applicant: KYOCERA CORPORATION, Kyoto (JP)

(72) Inventor: Takayuki Sato, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/052,729

(22) Filed: Feb. 24, 2016

(65) Prior Publication Data

US 2016/0248993 A1 Aug. 25, 2016

(30) Foreign Application Priority Data

Feb. 25, 2015 (JP) ................................ 2015-034765

(51) Int. Cl.
*H04N 5/262* (2006.01)
*G06T 3/40* (2006.01)

(52) U.S. Cl.
CPC ......... *H04N 5/2628* (2013.01); *G06T 3/4038* (2013.01); *H04N 5/2624* (2013.01)

(58) Field of Classification Search
CPC ............... H04N 5/2628; H04N 5/2624; H04N 5/23293; G06T 3/4038
See application file for complete search history.

(56) References Cited

U.S. PATENT DOCUMENTS

| | | | |
|---|---|---|---|
| 2006/0010382 A1* | 1/2006 | Ejiri | G06Q 10/109 715/712 |
| 2007/0257993 A1* | 11/2007 | Hara | G06F 17/30265 348/231.2 |
| 2010/0079610 A1* | 4/2010 | Suehiro | H04N 5/23219 348/222.1 |
| 2010/0192106 A1* | 7/2010 | Watanabe | G09G 5/14 715/838 |
| 2010/0302595 A1* | 12/2010 | Yamada | H04N 5/23293 358/1.18 |
| 2010/0310232 A1* | 12/2010 | Iwase | H04N 5/23293 386/241 |
| 2011/0141305 A1* | 6/2011 | Iwamoto | H04N 5/23293 348/222.1 |
| 2012/0194741 A1* | 8/2012 | Hyun | H04N 21/4312 348/564 |
| 2014/0218554 A1* | 8/2014 | Yang | H04N 5/772 348/220.1 |
| 2015/0002527 A1* | 1/2015 | Chedeau | G06T 11/60 345/581 |
| 2015/0229850 A1* | 8/2015 | Lee | H04N 5/23216 348/220.1 |
| 2016/0299893 A1* | 10/2016 | Zhao | G06F 3/03 |

FOREIGN PATENT DOCUMENTS

JP 2014-137742 7/2014

* cited by examiner

*Primary Examiner* — Jason Flohre
(74) *Attorney, Agent, or Firm* — Duane Morris LLP

(57) ABSTRACT

An electronic apparatus, storage medium, and method are disclosed. An electronic apparatus includes a display and at least one processor. The display comprises a first display mode in which a plurality of images are displayed alongside each other. The at least one processor determines importance of an image. The at least one processor determines a display size of each of the plurality of images. The at least one processor increases the display size of an image as the importance of the image is higher.

15 Claims, 12 Drawing Sheets

F I G. 5
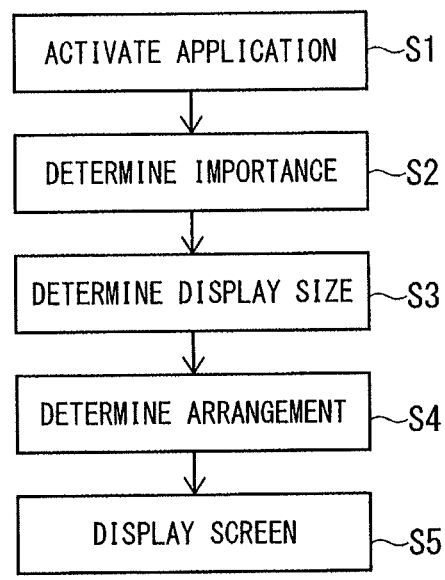

F I G. 7
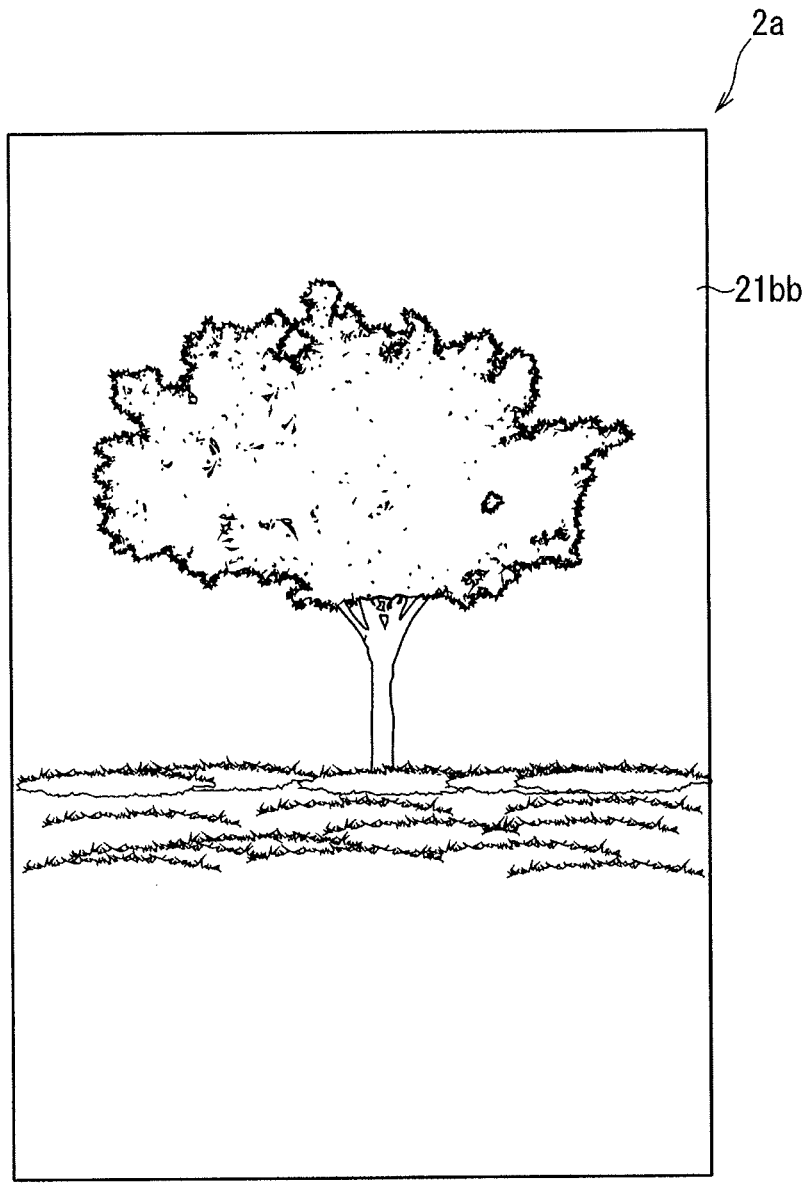

ELECTRONIC APPARATUS, STORAGE MEDIUM, AND METHOD FOR DISPLAYING IMAGE

CROSS-REFERENCE TO RELATED APPLICATION

The present application claims priority under 35 U.S.C. § 119 to Japanese Patent Application No. 2015-034765, filed on Feb. 5, 2015, entitled "ELECTRONIC APPARATUS, CONTROL PROGRAM, AND METHOD FOR OPERATING ELECTRONIC APPARATUS". The contents of which are incorporated by reference herein in its entirety.

FIELD

Embodiments of the present disclosure relate to an electronic apparatus.

BACKGROUND

Technologies have conventionally been disclosed that display a plurality of images alongside each other.

SUMMARY

An electronic apparatus, storage medium, and method are disclosed. In one embodiment, an electronic apparatus comprises a display and at least one processor. The display comprises a first display mode in which a plurality of images are displayed alongside each other. The at least one processor determines importance of an image. The at least one processor determines a display size of each of the plurality of images. The at least one processor increases the display size of an image as the importance of the image is higher.

In one embodiment, a non-transitory storage medium readable by a computer stores a control program that controls an electronic apparatus. The storage medium storing the control program is configured to cause the electronic apparatus to execute (a) displaying a plurality of images alongside each other, (b) determining importance of an image, and (c) determining a display size of each of the plurality of images. In the step (c), the display size of an image is increased as the importance of the image is higher.

In one embodiment, a method for displaying an image comprises (a) displaying a plurality of images alongside each other, (b) determining importance of an image, and (c) determining a display size of each of the plurality of images. In the step (c), the display size of an image is increased as the importance of the image is higher.

BRIEF DESCRIPTION OF THE DRAWINGS

FIG. 5 illustrates a flowchart showing an example of an operation of the electronic apparatus.

FIG. 7 schematically illustrates an example of how a selectively manipulated image is enlarged and displayed.

DETAILED DESCRIPTION

External Appearance of Electronic Apparatus

Figure 1:
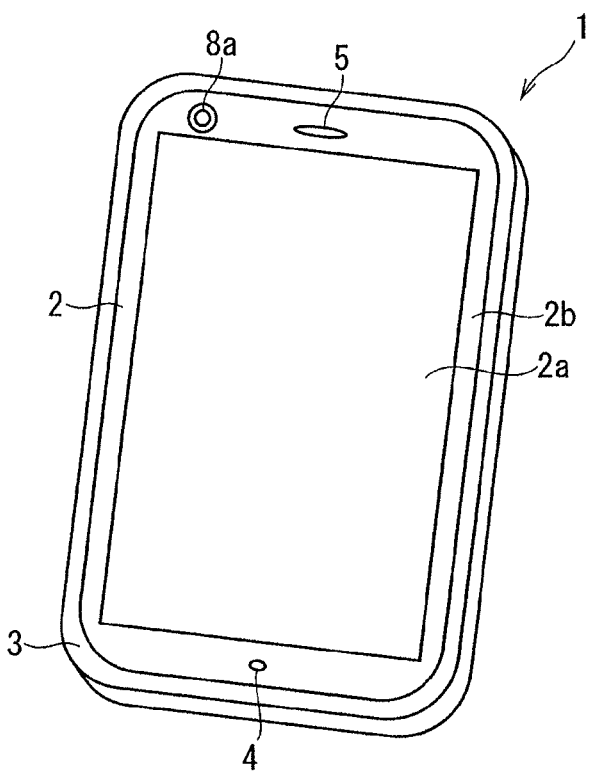
FIG. 1 illustrates a schematic perspective view of an example of an external appearance of an electronic apparatus.
Figure 2:
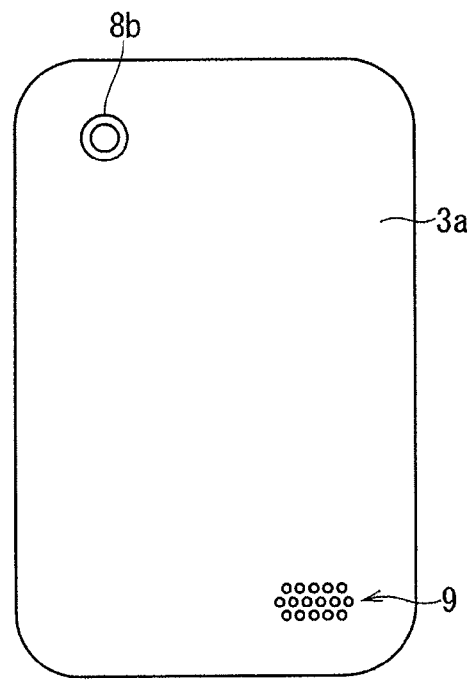
FIG. 2 illustrates a schematic rear view of the example of the external appearance of the electronic apparatus.

FIG. 1 illustrates a schematic perspective view of an example of an external appearance of an electronic apparatus 1. FIG. 2 illustrates a schematic rear view of the example of the external appearance of the electronic apparatus 1. The electronic apparatus 1 is, for example, a mobile phone such as a smartphone.

As illustrated in FIGS. 1 and 2, the electronic apparatus 1 includes a cover panel 2 located on the front surface of the electronic apparatus 1 and a case 3 to which the cover panel 2 is attached. The cover panel 2 and the case 3 constitute a casing of the electronic apparatus 1. The electronic apparatus 1 may have a substantially rectangular plate shape in a plan view.

The cover panel 2 constitutes a portion other than a peripheral edge portion in a front portion of the electronic apparatus 1. The case 3 constitutes the peripheral edge portion of the front portion, the lateral portion, and the rear portion of the electronic apparatus 1. The case 3 is made of, for example, resin or resin and metal. The resin may be, for example, a polycarbonate resin, ABS resin, or nylon resin. The metal may be, for example, aluminum.

The cover panel 2 may be shaped into a plate and have a substantially rectangular shape in a plan view. The cover panel 2 is made of, for example, acrylic resin, glass, or sapphire. Herein, sapphire refers to a single crystal containing alumina ($Al_2O_3$) as a main component, which is a single crystal whose purity of $Al_2O_3$ is approximately greater than or equal to 90% in the present specification. The purity of $Al_2O_3$ is preferably greater than or equal to 99% which provides a resistance to damage of the cover panel 2 and a reduction in cracks or chipping. Other examples of the material for the cover panel 2 include crystalline materials such as diamond, zirconia, titania, crystal, lithium tantalate, and aluminum oxynitride. These materials are preferably single crystal materials whose purity is approximately greater than or equal to 90% which provides a resistance to damage of the cover panel 2 and a reduction in cracks or chipping.

The cover panel 2 may be a composite panel (hereinafter, also referred to as a laminated panel) of a multilayer structure including a layer of sapphire. For example, the cover panel 2 may be a composite panel of a two-layered structure configured of a layer made of sapphire (hereinafter, also referred to as a sapphire panel) which is located on the surface of the electronic apparatus 1 and a layer made of glass (hereinafter, also referred to as a glass panel) which is attached to the sapphire panel. The cover panel 2 may be a laminated panel of a three-layered structure configured of a first sapphire panel located on the surface of the electronic apparatus 1, a glass panel attached to the first sapphire panel, and a second sapphire panel attached to the glass panel. Or, the cover panel 2 may include a layer made of crystalline materials other than sapphire such as diamond, zirconia, titania, crystal, lithium tantalite, and aluminum oxynitride.

The cover panel 2 includes a transparent and/or light transmissive display area (also referred to as a display window) 2a transmitting the display of a display 12 described below. The display area 2a may have, for example, a rectangular shape in a plan view. The visible light output from the display 12 passes through the display area 2a and is emitted to the outside of the electronic apparatus 1. A user of the electronic apparatus 1 can visually recognize the information displayed on the display 12 through the display area 2a from the outside of the electronic apparatus 1. A portion of a peripheral edge portion 2b that surrounds the display area 2a in the cover panel 2 is opaque and/or not transparent because of, for example, a film or the like that is attached thereto. The portion of the peripheral edge portion 2b is accordingly a non-display portion that does not transmit the display of the display 12.

To the rear surface of the cover panel 2 is attached a touch panel 13 described below. The display 12 is attached to the surface on the opposite side to the cover panel 2 of the touch panel 13. That is, the display 12 is installed on the rear surface of the cover panel 2 with the touch panel 130 therebetween. The user of the electronic apparatus 1 can provide various instructions to the electronic apparatus 1 by manipulating the display area 2a of the cover panel 2 using a finger or the like.

As illustrated in FIG. 1, a first transparent portion 8a for the front lens is provided at an upper end of the cover panel 2, through which an imaging lens of a front imager 18a described below is visually recognizable from the outside of the electronic apparatus 1. In addition, the cover panel 2 has a receiver hole 5 provided at its upper end and a microphone hole 4 provided at its lower end.

As illustrated in FIG. 2, a second transparent portion 8b for the rear surface is provided at the upper end of a rear surface 3a of the case 3, through which an imaging lens of a rear imager 18b is visually recognizable from the outside of the electronic apparatus 1. At the lower end of the rear surface 3a of the electronic apparatus 1 are provided speaker holes 9.

Electrical Configuration of Electronic Apparatus

Figure 3:
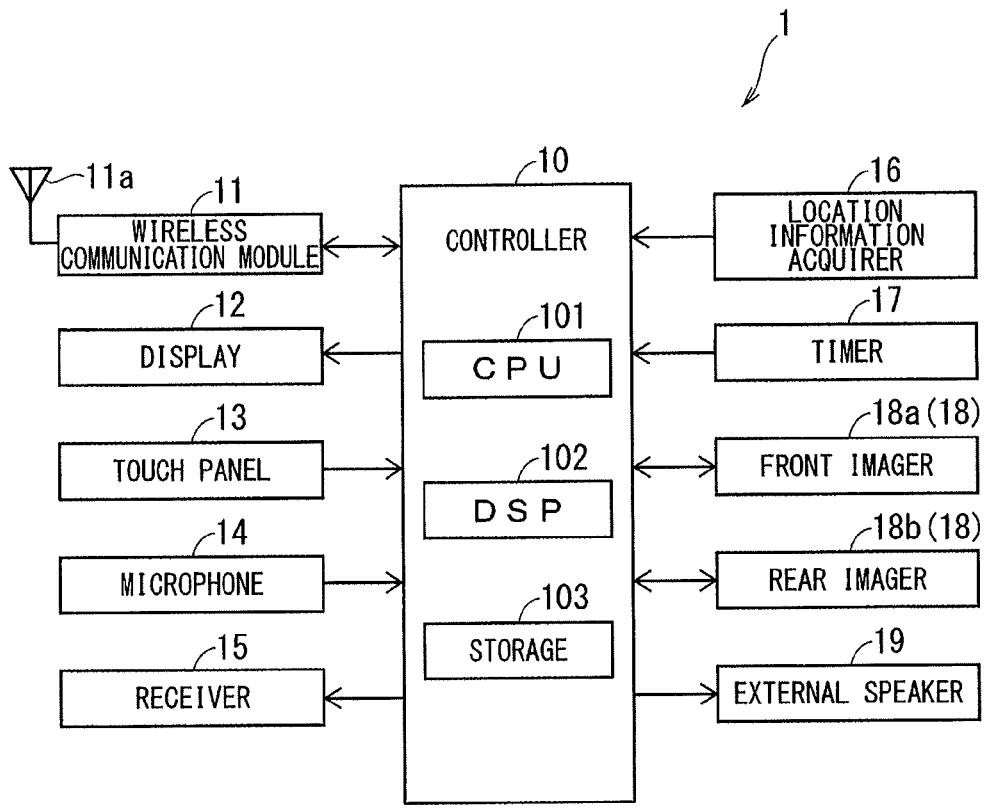
FIG. 3 illustrates an example of an electrical configuration of the electronic apparatus.

FIG. 3 illustrates a block diagram of an example of an electrical configuration of the electronic apparatus 1. As illustrated in FIG. 3, the electronic apparatus 1 includes a controller 10, a wireless communication module 11, a display 12, a touch panel 13, a microphone 14, a receiver 15, a location information acquirer 16, a timer 17, a front imager 18a, a rear imager 18b, and an external speaker 19. These elements of the electronic apparatus 1 are each accommodated in the case 3.

The controller 10 is a type of computer and includes, for example, a Central Processing Unit (CPU) 101, a Digital Signal Processor (DSP) 102, and a storage 103. The controller 10 can manage the overall operation of the electronic apparatus 1 by controlling other elements of the electronic apparatus 1.

The storage 103 includes a non-transitory recording medium readable by the CPU 101 and the DSP 102 such as a Read Only Memory (ROM) and a Random Access Memory (RAM). The storage 103 stores a main program for controlling the electronic apparatus 1, a plurality of application programs (hereinafter, also merely referred to as applications), and the like. The storage 103 also stores a plurality of images to be displayed on the display 12. Various functions of the controller 10 can be realized by the CPU 101 and the DSP 102 executing various programs in the storage 103.

In addition to the ROM and the RAM, the storage 103 may include a non-transitory recording medium, which is readable by a computer. The storage 103 may include, for example, a compact hard disk drive and a Solid State Drive (SSD). A part or the whole of the functions of the controller 10 may be realized by hardware that does not require software to realize such functions.

The wireless communication module 11 includes an antenna 11a. In the wireless communication module 11, the antenna 11a can receive a signal from a mobile phone different from the electronic apparatus 1 or a signal from a communication device such as a web server connected to the Internet via a base station. The wireless communication module 11 can perform amplification processing and down conversion on the reception signal received by the antenna 11a and output the signal to the controller 10. The controller 10 can perform demodulation processing or the like on the input reception signal to acquire the information contained in the reception signal.

The wireless communication module 11 can perform up-converting and amplification processing on a transmission signal generated in the controller 10 and wirelessly transmit the processed transmission signal from the antenna 11a. The transmission signal from the antenna 11a is received by a communication device connected to the Internet or a mobile phone different from the electronic apparatus 1 via the base station.

The display 12 is formed of, for example, a liquid crystal display or an organic electro luminescent (EL) display. The display 12 can display various pieces of information such as characters, symbols, figures, and images by control of the controller 10. The information displayed by the display 12 is visually recognizable by the user of the electronic apparatus 1 through the display area 2a of the cover panel 2.

The touch panel 13 can detect a manipulation by a manipulator such as a finger which is performed on the display area 2a of the cover panel 2. The touch panel 13 is, for example, a projection type electrostatic capacitance touch panel. When the user manipulates the display area 2a of the cover panel 2 with the manipulator such as a finger, a manipulation signal according to the manipulation is input from the touch panel 13 to the controller 10. The controller 10 can specify the contents of the manipulation performed on the display area 2a based on a manipulation signal from the touch panel 13 and perform processing according to the specified contents. The user can also manipulate the display area 2a with a manipulator other than a finger, for example, a pen for electrostatic touch panel such as a stylus pen, to provide various instructions to the electronic apparatus 1.

The location information acquirer 16 can acquire the current location of the electronic apparatus 1. The location information acquirer 16 is, for example, a device based on a Global Positioning System (GPS). The location information acquirer 16 can receive a GPS signal from a GPS satellite to obtain the location information indicative of the current location of the electronic apparatus 1 based on the GPS signal. The location information includes, for example, latitude information and longitude information.

The timer 17 can count the current time as well as current date. The timer 17 includes, for example, a real time clock (RTC). The timer 17 can output, to the controller 10, the time information indicative of the time of counting and the date information indicative of the date of counting.

The front imager 18a includes an imaging lens and an imaging sensor. The front imager 18a can image a still image and a dynamic image based on the control by the controller 10. The imaging lens of the front imager 18a is visually recognizable from the first transparent portion 8a located on the front surface of the electronic apparatus 1. The front imager 18a therefore can image an object in front of the surface, that is, on the cover panel 2 side, of the electronic apparatus 1.

The rear imager 18b includes an imaging lens and an imaging sensor. The rear imager 18b can image a still image and a dynamic image based on the control by the controller 10. The imaging lens of the rear imager 18b is visually recognizable from the second transparent portion 8b located on the rear surface 3a of the case 3. The rear imager 18b therefore can image an object on the rear surface 3a side of the case 3. Hereinafter, each of the front imager 18a and the rear imager 18b may be merely referred to as an imager 18.

The microphone 14 can convert a sound from the outside of the electronic apparatus 1 into an electrical sound signal and then output the sound signal to the controller 10. The sound from the outside of the electronic apparatus 1 is received, for example, by the microphone 14 through the microphone hole 4 located on the front surface of the cover panel 2.

The external speaker 19 is, for example, a dynamic speaker. The external speaker 19 can convert the electric sound signal from the controller 10 into a sound and then output the sound. The sound from the external speaker 19 is, for example, output to the outside through the speaker holes 9 located on the rear surface 3a of the case 3. The volume of the sound output through the speaker holes 9 is set to such a degree that the sound can be heard in a place separated from the electronic apparatus 1.

The receiver 15 outputs a reception sound and includes, for example, a dynamic speaker. The receiver 15 can convert an electric sound signal from the controller 10 into a sound and then output the sound. The sound output from the receiver 15 is output, for example, to the outside through the receiver hole 5 located on the front surface of the electronic apparatus 1. The volume of the sound output through the receiver hole 5 is set to be lower than, for example, the volume of the sound output from the external speaker 19 through the speaker holes 9.

A piezoelectric vibrating element may be provided in place of the receiver 15. The piezoelectric vibrating element is controlled by the controller 10 and can vibrate based on a sound signal. The piezoelectric vibrating element is provided, for example, on the rear surface of the cover panel 2 and can cause the cover panel 2 to vibrate by the vibration of itself based on the sound signal. The user causes his/her ear to approach the cover panel 2, so that the vibration of the cover panel 2 is transmitted to the user as a voice. In this case, the receiver hole 5 is not required.

Operation of Electronic Apparatus

Figure 4:
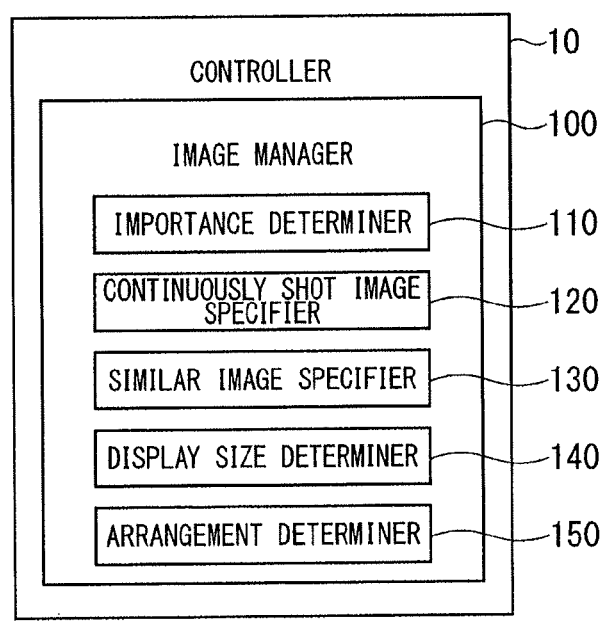
FIG. 4 illustrates an example of a functional block configured in a controller.

FIG. 4 illustrates an example of a functional block configured in the controller 10. The storage 103 stores an image management application for the user to browse or organize a plurality of images (including still images and dynamic images) within the storage 103. The image management application is executed by the controller 10 that executes the main program, so that an image manager 100 is configured in the controller 10 as illustrated in FIG. 4. The image manager 100 includes an importance determiner 110, a continuously shot image specifier 120, a similar image specifier 130, a display size determiner 140, and an arrangement determiner 150. During the execution of the image management application, the display 12 can operate, by the control of the controller 10, in a list display mode in which a plurality of images are displayed alongside each other. During the execution of the image management application, also, the display 12 can operate in an enlargement display mode in which out of a plurality of images displayed in the list display mode, only an image selected by the user is enlarged and displayed. Images are displayed larger in the enlargement display mode than in the list display mode. The list display mode is referred to as a first display mode, and the enlargement display mode is referred to as a second display mode.

FIG. 5 illustrates a flowchart showing an example of the operation of the electronic apparatus 1. The operation of the electronic apparatus 1 will be described below in detail along the flowchart of FIG. 5.

In Step S1, first, the controller 10 executes (activates) the image management application in the storage 103. The display 12 displays, for example, an initial screen (hereinafter, also referred to as a home screen) in the initial state before the electronic apparatus 1 executes various applications. The display 12 displays a picture for executing an application (hereinafter, also referred to as an application executing picture) in the home screen. The application executing picture may include a picture referred to as an icon. When the touch panel 13 detects a selection manipulation that is performed by the user on the application executing picture, displayed on the display 12, for executing the image management application, the controller 10 executes the image management application in the storage 103.

The selection manipulation that is performed on the application executing picture displayed on the display 12 may be, for example, a manipulation in which the user causes the manipulator such as a finger to approach the application executing picture displayed in the display area 2a of the cover panel 2 and then causes the manipulator to move away from the application executing picture. In addition, the selection manipulation performed on the application executing picture may be, for example, a manipulation in which the user causes the manipulator such as a finger to touch the application executing picture displayed in the display area 2a of the cover panel 2 and then causes the manipulator to move away from the application executing picture. These manipulations are referred to as tapping. The selection manipulation by tapping is used as the selection manipulation performed on an image displayed by the display 12, in addition to the selection manipulation performed on the application executing picture. A repetitive explanation of the selection manipulation by tapping will be omitted below.

When the image management application is executed as a result of the execution of Step S1, in Steps S2 to S4, the image manager 100 executes a series of processing steps for operating the display 12 in the list display mode. Specifically, in Step S2, first, the importance determiner 110 determines the importance of each image to be displayed by the display 12 for the user. In Step S3, next, based on the importance determined by the importance determiner 110, the display size determiner 140 determines the display size of each image to be displayed by the display 12 in the list display mode. The display size determiner 140 increases the display size of an image as the importance of the image is higher. In Step S4, next, the arrangement determiner 150 determines arrangements of a plurality of images on the display screen (hereinafter, also referred to as a list display screen) in which the plurality of image are arranged and which is displayed by the display 12 in the list display mode. The operations of the importance determiner 110, the display size determiner 140, and the arrangement determiner 150 will be described below in detail.

Figure 6:
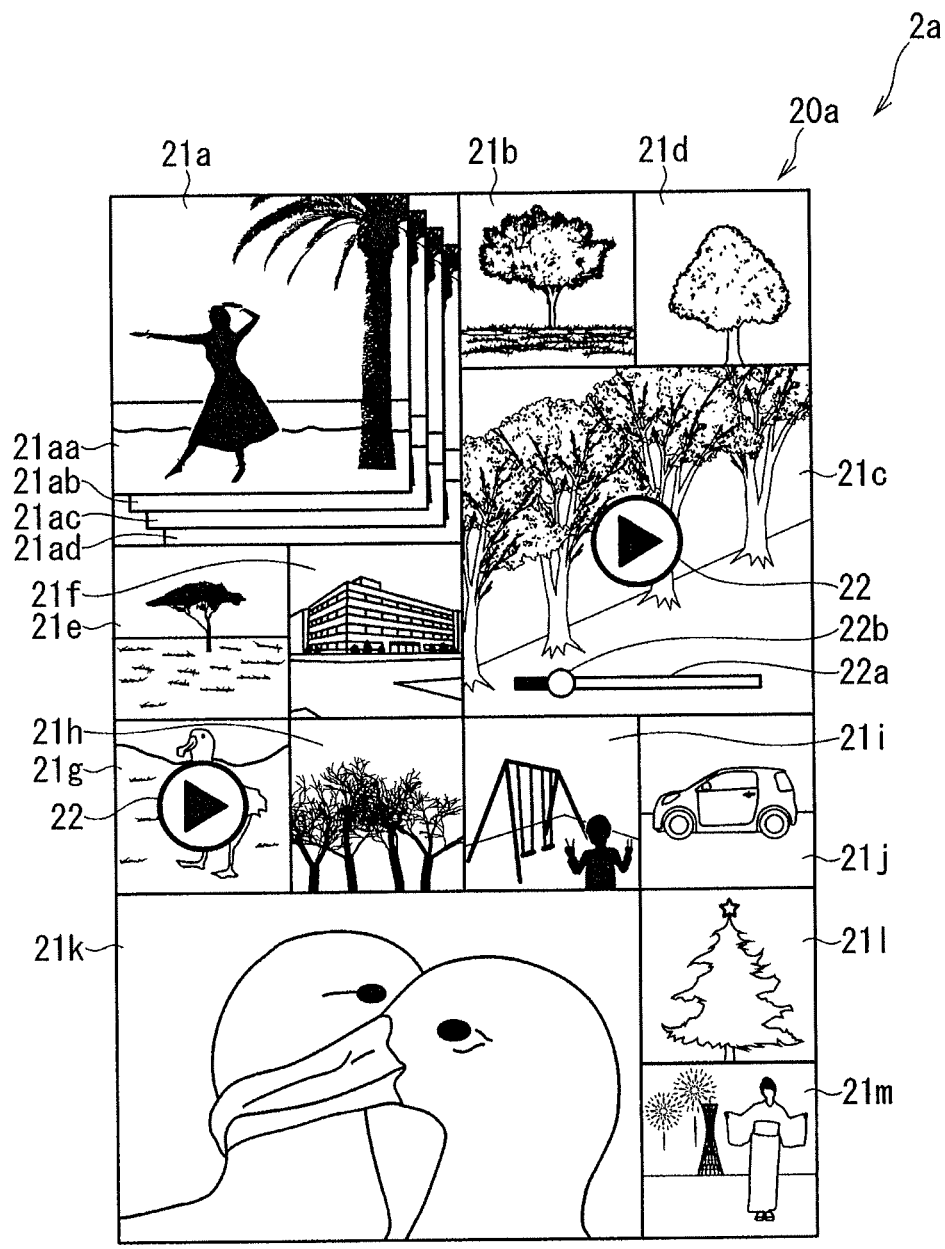
FIG. 6 schematically illustrates an example of a list display screen.

In Step S5, the display 12 operates in the list display mode by the control of the controller 10. This causes the display 12 to display the list display screen. FIG. 6 schematically illustrates an example of the list display screen 20a. Images 21a to 21m are arranged and displayed on the list display screen 20a illustrated in FIG. 6. The images 21a to 21m are stored in the storage 103. In one embodiment, each of the images 21a to 21m is, for example, an image obtained by scaling down an original image in the storage 103 and is also referred to as a thumbnail image. In the illustration of FIG. 6, a plurality of images 21a to 21m are arranged from the upper left along the raster direction in a chronological order of the date and time of image capturing. Out of the plurality of images 21a to 21m, accordingly, the image 21a has the earliest date and time of image capturing. The order of arranging images is not limited to this order.

The display 12 displays a plurality of images in a plurality of display sizes on the list display screen 20a. In the illustration of FIG. 6, the display 12 displays the images 21a to 21m in three display sizes, namely first to third display sizes. Specifically, the images 21b, 21d to 21j, 21l, and 21m are displayed in the first display size. The images 21a and 21c are displayed in the second display size. The image 21k is displayed in the third display size. The display size increases in order of the first to third display sizes. As illustrated in FIG. 6, the display 12 displays a plurality of images varying in display size in such a manner that these images are arranged on the list display screen 20a with the smallest possible gap. The display sizes of images and the method for arranging images on the list display screen 20a will be described below in detail.

When many images are displayed on the list display screen 20a, part of the list display screen 20a is displayed in the display area 2a. In this case, the user can scroll the list display screen 20a to display the images, which have not been displayed in the display area 2a, in the display area 2a.

When the touch panel 13 detects an application ending manipulation for ending the image management application during the execution of the image management application, the controller 10 ends the execution of the image management application. When the execution of the image management application ends, for example, a home screen appears on the display 12. The application ending manipulation may be, for example, the manipulation of selecting a manipulation button, which is displayed by the display 12, by the user to end the image management application. The application ending manipulation is not limited to the touch manipulation performed on the touch panel 13, which may be, for example, pressing a hard button located on the case 3. The description above is also applicable to other manipulations below, and thus, a repetitive description will be omitted.

When the user selectively manipulates one of a plurality of images displayed on the list display screen 20a displayed by the display 12 during the execution of the image management application, the operation of the display 12 changes from the list display mode to the enlargement display mode. In the enlargement display mode, the selectively manipulated image is enlarged and displayed.

FIG. 7 schematically illustrates an example of how an image selectively manipulated by the user is enlarged and displayed. In the illustration of FIG. 7, the image 21b displayed on the list display screen 20a is selected, and an enlarged image 21bb of the image 21b is displayed in the display area 2a.

In this manner, the user can select an image in the list display screen 20a to cause the display 12 to enlarge and display the image.

When the touch panel 13 detects a predetermined manipulation for returning the display 12 to the list display mode while the display 12 is in the enlargement display mode, the operation mode of the display 12 changes from the enlargement display mode to the list display mode. Consequently, the list display screen 20a is displayed again on the display 12.

When displaying a plurality of continuously shot images captured by one continuous shooting, which are specified by the continuously shot image specifier 120, the display 12 operating in the list display mode displays a first image (hereinafter, also referred to as a first superimposed image) including the plurality of continuously shot images superimposed on one another. In the illustration of FIG. 6, the display 12 displays a first superimposed image 21a including four continuously shot images 21aa to 21ad superimposed on one another. For each of three continuously shot images behind the topmost continuously shot image out of the four continuously shot images 21aa to 21ad, only its right edge and lower edge are displayed.

The first superimposed image including a plurality of continuously shot images superimposed on one another, which are captured by one continuous shooting, is displayed in this manner, thus allowing the user to easily specify whether the image displayed in the list display mode by the display 12 is a continuously shot image. Moreover, a plurality of continuously shot images captured by one continuous shooting are displayed in a smaller range of the list display screen 20a, thus allowing the user to easily find an image other than images of a continuously shot image group. The operation of the continuously shot image specifier 120 and the first superimposed image will be described below in detail.

Figure 8:
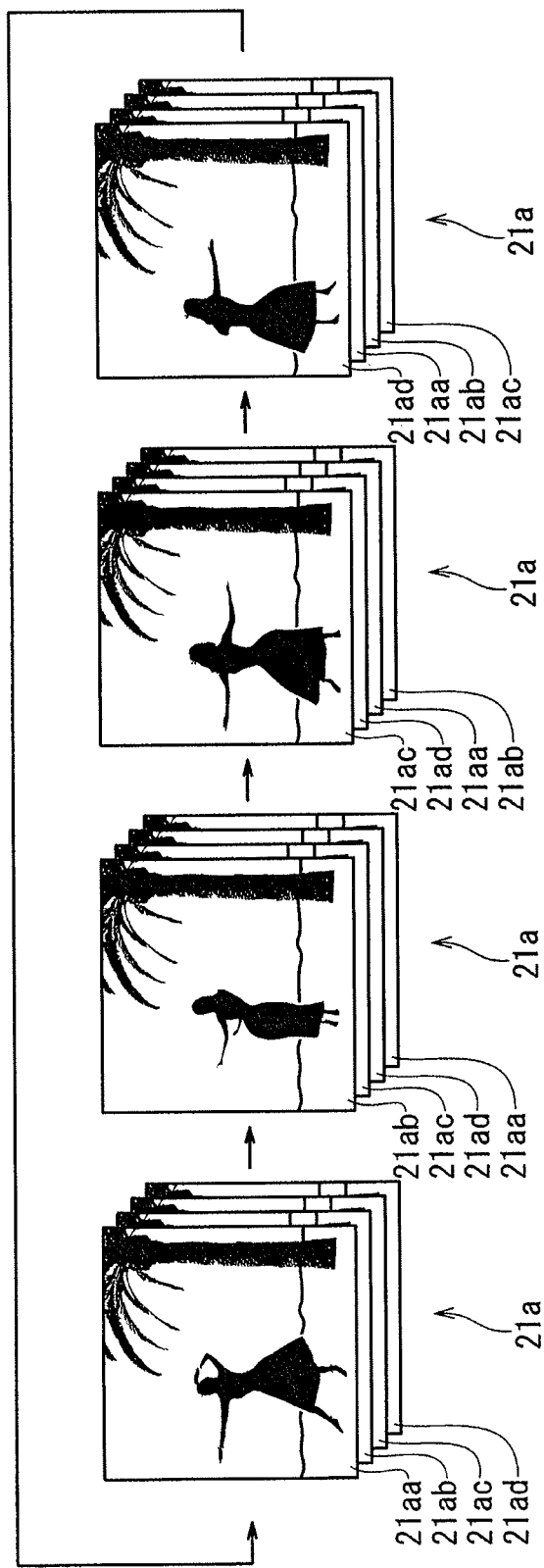
FIG. 8 illustrates how a topmost continuously shot image is switched sequentially.

The display 12 in the list display mode displays the first superimposed image 21a while sequentially switching a topmost continuously shot image among the four continuously shot images 21aa to 21ad of the first superimposed image 21a. FIG. 8 illustrates how a topmost continuously shot image is sequentially switched among the four continuously shot images 21aa to 21ad of the first superimposed image 21a. FIG. 8 illustrates how a topmost image is sequentially switched in time series from left to right. First, the display 12 displays the first superimposed image 21a, which is the leftmost in FIG. 8. In the first superimposed image 21a, the continuously shot image 21aa is the topmost image out of the four continuously shot images 21aa to 21ad. The continuously shot images 21aa to 21ad are arranged and displayed from top to bottom in, for example, a chronological order of the date and time of image capturing.

Next, the display 12 displays the first superimposed image 21a, which is the second from the left in FIG. 8. In the first superimposed image 21a, the continuously shot image 21ab is the topmost image and the continuously shot image 21aa is the bottommost image. Next, the display 12 displays the first superimposed image 21a, which is the third from the left in FIG. 8. In the first superimposed image 21a, the continuously shot image 21ac is the topmost image and the continuously shot images 21ab is the bottommost image. Next, the display 12 displays the first superimposed image 21a, which is the fourth from the left in FIG. 8. In the first superimposed image 21a, the continuously shot image 21ad is the topmost image and the continuously shot image 21ac is the bottommost image. Next, the display 12 again displays the first superimposed image 21a, which is the leftmost in FIG. 8. Hereinafter, the first superimposed image 21a is displayed in a similar manner. The topmost image is switched as described above, for example, every predetermined time.

In this manner, the display 12 displays the first superimposed image 21a while sequentially switching a topmost continuously shot image among a plurality of continuously shot images captured in one continuous shooting, which are included in the first superimposed image 21a. This allows the user to easily specify what images the respective continuously shot images are.

When displaying a plurality of similar images specified by the similar image specifier 130, whose dates and times of image capturing are close to each other and which are similar to each other, the display 12 operating in the list display mode displays a second image (hereinafter, also referred to as a second superimposed image) including the plurality of similar image superimposed on one another. The second superimposed image is displayed similarly to the first superimposed image. This allows the user to easily specify whether an image displayed in the list display mode by the display 12 is a similar image. Moreover, a group of similar images is displayed in a smaller range of the list display screen 20a, thus allowing the user to easily find an image other than images of a similar image group. The operation of the similar image specifier 130 and the second superimposed image will be described below in detail.

The display 12 operating in the list display mode displays a second superimposed image while sequentially switching a topmost image among a plurality of similar images of the second superimposed image, similarly to the first superimposed image. This allows the user to easily specify what images the respective similar images are. In one embodiment, the display 12 displays the first superimposed image and the second superimposed image while sequentially switching a topmost image. Alternatively, the display 12 may display the first superimposed image and the second superimposed image without switching the topmost image of at least one of the first and second superimposed images.

When displaying a dynamic image, the display 12 operating in the list display mode displays the dynamic image while playing back the dynamic image. In the illustration of FIG. 6, the images 21c and 21g are dynamic images. Each of the images 21c and 21b includes a dynamic image playback control button 22. The user can manipulate the dynamic image playback control button 22 to cause the electronic apparatus 1 to play back a dynamic image or stop the playback of a dynamic image. The dynamic image playback control button 22 is shown in the dynamic image displayed on the list display screen 20a, thus allowing the user to easily specify whether an image displayed in the list display mode by the display 12 is a dynamic image. A dynamic image is played back and displayed on the list display screen 20a, thus allowing the user to recognize the contents of the dynamic image. The display 12 operating in the list display mode may not show the dynamic image playback control button 22 in a dynamic image but, when displaying a dynamic image, may automatically play back the dynamic image without being instructed by the user. As illustrated in the image 21c of FIG. 6, the dynamic image may include a seek bar 22a indicative of the playback point of a dynamic image. Alternatively, the user may manipulate the position of a slider 22b of the seek bar 22a to change the playback point of a dynamic image.

Importance Determiner

The importance determiner 110 determines the importance of an image displayed by the display 12 for the user. The importance is determined based on a plurality of evaluation values. The importance is determined based on, for example, the sum of a plurality of evaluation values. In one embodiment, the importance determiner 110 determines the importance of an image based on first to fourth evaluation values. In other words, the importance determiner 110 uses the sum of the first to fourth evaluation values of an image as the importance of the image. Each of the first to fourth evaluation values indicates the result obtained by the importance determiner 110 evaluating the importance of an image based on predetermined evaluation criteria. The first to fourth evaluation values will be each described below in detail.

First Evaluation Value

The first evaluation value is a value by which an image that has been enlarged and displayed a larger number of times (hereinafter, also referred to as a number of enlargement displays) by the display 12 in the enlargement display mode is evaluated as having higher importance. An image with a larger number of enlargement displays is, for example, an image that a user favors and views many times, and thus can be regarded as an image having high importance for the user.

Figure 9:
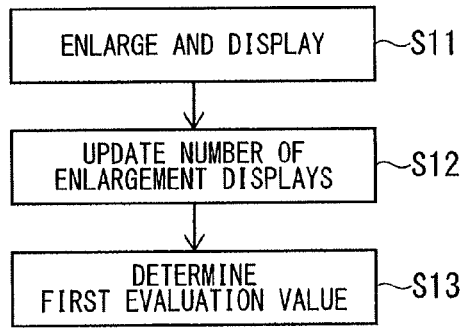
FIG. 9 illustrates a flowchart showing an example of an operation of an importance determiner.

FIG. 9 illustrates a flowchart showing an example of the operation in which the importance determiner 110 determines the first evaluation value. In Step S11, first, the display 12 enlarges and displays a selected image selected from the list display screen 20a in the enlargement display mode.

In Step S12, next, the importance determiner 110 updates a number of enlargement displays of the selected image that has been enlarged and displayed in Step S11. Herein, the importance determiner 110 stores, in the storage 103, the number of enlargement displays of an image displayed by the display 12 in association with the image. Then, when the selected image is enlarged and displayed in Step S11, in Step S12, the importance determiner 110 increases, by one, the number of enlargement displays of the selected image. As a result, the number of enlargement displays of the selected image is updated.

In Step S13, next, the importance determiner 110 determines the first evaluation value of the image. The first evaluation value is determined from, for example, points 0 to 3. The importance determiner 110 increases a first evaluation value of an image as the number of enlargement displays of the image is larger. For example, the importance determiner 110 sets the first evaluation values of the images whose number of enlargement displays is 0, 1 to 10, 11 to 20, and 21 or more as points 0, 1, 2, and 3, respectively. The importance becomes higher as the first evaluation value is greater, and accordingly, the display 12 displays an image larger on the list display screen 20a as the image has a larger number of enlargement displays. This allows the user to easily find an image with a large number of enlargement displays, that is, an image having high importance for the user.

The importance determiner 110 increases a first evaluation value of an image as the number of enlargement displays of the image is larger. Alternatively, the importance determiner 110 may increase the first evaluation value of an image as the image has been enlarged and displayed for a longer total time (accumulated time). In this case, the importance determiner 110 records, in the storage 103, the total time (accumulated time) in which an image has been enlarged and displayed in association with the image. When a selected image is enlarged and displayed, the importance determiner 110 measures, based on the time information acquired by the timer 17, a display time from the start of enlarging and displaying the selected image to the end of enlarging and displaying the selected image. The importance determiner 110 then adds the measured display time to the total time of the selected image enlarged and displayed. This updates the total time in which the selected image has been enlarged and displayed. The importance determiner 110 determines the first evaluation value of a selection target image based on the updated total time. In this case, the importance determiner 110 increases the first evaluation value of an image as the image has been enlarged and displayed for a longer total time. The display 12 accordingly displays an image larger on the list display screen 20a as the image has been enlarged and displayed for a longer total time. The user can thus easily find an image that has been enlarged and displayed for a long total time. The image that has been enlarged and displayed for a long total time is, for example, an image that the user favors and repeatedly views many times or an image that the user views for a long period of time in one enlargement display, and can accordingly be regarded as an image having high importance for the user. This allows the user to easily find an image having high importance.

Second Evaluation Value

The second evaluation value is a value by which an image that has a higher evaluation value input to the electronic apparatus 1 by the user is evaluated as having higher importance. The second evaluation value is evaluated by the user himself/herself, and accordingly, the image that has a high second evaluation value can be regarded as an image having high importance for the user.

Figure 10:
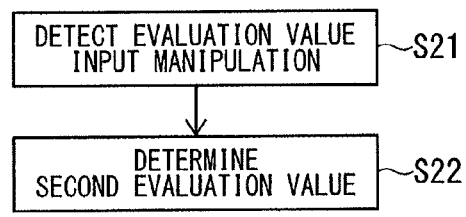
FIG. 10 illustrates a flowchart showing an example of another operation of the importance determiner.

FIG. 10 illustrates a flowchart showing an example of the operation in which the importance determiner 110 determines a second evaluation value. In Step S21, first, the touch panel 13 detects a second evaluation value input manipulation by the user. For example, when the touch panel 13 detects that the user has performed a predetermined manipulation for designating a target image, to which a second evaluation value is input, on an image to be displayed on the list display screen 20a, the display 12 in the list display mode displays an input screen for inputting a second evaluation value of the target image. The user inputs the second evaluation value of the target image using the input screen. For example, the user can input the number of stars on the input screen to input the second evaluation value of a target image. The user performs the manipulation of inputting the number of stars, from zero to three, on the input screen, namely, the second evaluation value input manipulation.

In Step S22, next, the importance determiner 110 determines the second evaluation value of the image. The second evaluation value is determined from, for example, points 0 to 3. The importance determiner 110 sets, for example, the second evaluation values of three images whose number of stars input in Step S21 is 0, 1, 2, and 3 as points 0, 1, 2, and 3, respectively. The importance becomes higher as the second evaluation value is greater. The display 12 accordingly displays an image larger on the list display screen 20a as the image is evaluated more highly by the user. This allows the user to easily find an image highly evaluated by the user, that is, an image having high importance for the user.

The user can input a new second evaluation value of the image to change the second evaluation value of the image. The method for inputting a second evaluation value by the user is not limited to the example above.

Third Evaluation Value

The third evaluation value is a value by which the importance of an evaluation target image is evaluated as being high when the evaluation target image is the first superimposed image or the second superimposed image. The third evaluation value indicates a great value when the evaluation target image is the first superimposed image or the second superimposed image. When the evaluation target image is the first superimposed image, the third evaluation value is a value by which the importance is evaluated as being higher as the first superimposed image includes more continuously shot images. Or, when the evaluation target image is the second superimposed image, the third evaluation value is a value by which the importance is evaluated as being higher as the second superimposed image includes more similar images.

The images captured by continuous shooting are highly likely to be images in which the user has caught a decisive moment or images in which the user desires to record a series of movements of a subject, and thus can be said to be images having high importance for the user. Similar images are highly likely to be images that the user has captured again and again by, for example, changing the composition, and thus can be said to be images having high importance for the user. When the number of images of a group is large, their importance is said to be higher for the user.

Before describing the operation in which the importance determiner 110 determines the third evaluation value, the continuously shot image specifier 120 and the similar image specifier 130 as well as the first superimposed image and the second superimposed image will be described below in detail.

The continuously shot image specifier 120 specifies, from a plurality of images in the storage 103, a group of images captured by the continuously shooting function of the imager 18 as a continuously shot image group. Further, the continuously shot image specifier 120 specifies, from a plurality of images in the storage 103, a group of images continuously captured within a first predetermined period as a continuously shot image group. In this case, the continuously shot image specifier 120 may specify a continuously shot image group based on the information on the date and time of image capturing contained in the meta information (meta information associated with an image) embedded in an image. Examples of the information embedded as the meta information in the image captured by the imager 18 include the name of the electronic apparatus 1, the information on the date and time of image capturing, indicative of the date and time when the image has been captured, and the information on the location of image capturing, indicative of the location of the electronic apparatus 1 when the image has been captured. Such information conforms to, for example, the exchangeable image file format (Exif) standard. The timer 17 acquires the information on the date and time of image capturing, and the location information acquirer 16 acquires the information on the location of image capturing. A continuously shot image group is specified when, for example, the image captured by the imager 18 is stored in the storage 103.

The image manager 100 generates a first superimposed image including a plurality of superimposed images that constitute the continuously shot image group specified by the continuously shot image specifier 120 and then stores the generated image in the storage 103.

The similar image specifier 130 specifies, from a plurality of images stored in the storage 103, an image group composed of a plurality of images captured within a second predetermined period based on the information on the data and time of image capturing contained in the meta information embedded in an image. As a result, an image group composed of a plurality of images whose dates and times of image capturing are close to each other is specified from the plurality of images in the storage 103. In this case, a plurality of image groups may be specified. The second predetermined period is set to a value greater than that of the first predetermined period. The similar image specifier 130 then judges whether the plurality of images constituting the specified image group are similar to each other. The well-known image processing technique, such as pattern matching, may be adopted in the judgment. The similar image specifier 130 sets, as a similar image group, an image group composed of a plurality of images judged to be similar to each other in this judgment. As a result, a similar image group composed of a plurality of similar images whose dates and times of image capturing are close to each other and which are similar to each other is specified from a plurality of images in the storage 103. The similar image group is specified in this manner when, for example, the image captured by the imager 18 is stored in the storage 103.

The image manager 100 generates a second superimposed image including a plurality of superimposed similar images specified by the similar image specifier 130, whose dates and times of image capturing are close to each other and which are similar to each other, and then stores the generated image in the storage 103.

The criteria by which the similar image specifier 130 identifies similar images are not limited to those described above. For example, even if the date of image capturing differs, the images which have been captured on times close to each other and in places close to each other may be specified as similar images. In this case, when the user captures images on the same time in the same place every day, a superimposed image including the images superimposed on one another can be displayed by the display 12.

Next, the operation in which the importance determiner 110 determines the third evaluation value will be described in detail.

The importance determiner 110 sets the third evaluation value as point 0 when the evaluation target image is neither the first superimposed image nor the second superimposed image or sets the third evaluation value as point 1 or higher when the evaluation target image is the first superimposed image or the second superimposed image. The importance becomes higher as the third evaluation value is greater, and thus, the display 12 displays the first superimposed image and the second superimposed image larger on the list display screen 20a. This allows the user to easily find the first superimposed image and the second superimposed image having high importance.

When a first superimposed image is generated, the importance determiner 110 determines a third evaluation value of the first superimposed image. The third evaluation value is determined from, for example, points 1 to 3. The importance determiner 110 sets a third evaluation value of a first superimposed image higher as the first superimposed image includes more continuously shot images. For example, the importance determiner 110 sets the third evaluation values of the first superimposed images including 2 to 10 continuously shot images, 11 to 20 continuously shot images, and 21 or more continuously shot images as points 1, 2, and 3, respectively. The importance becomes higher as the third evaluation value is greater, and accordingly, the display 12 displays a first superimposed image larger on the list display screen 20a as the first superimposed image includes more continuously shot images. This allows the user to easily find a first superimposed image with many continuously captured images.

When a second superimposed image is generated, the importance determiner 110 determines a third evaluation value of the second superimposed image. The third evaluation value is determined from, for example, points 1 to 3. The importance determiner 110 sets a third evaluation value of a second superimposed image higher as the second superimposed image includes more similar images. For example, the importance determiner 110 sets the third evaluation values of the second superimposed images including 2 to 10 similar images, 11 to 20 similar images, and 21 or more similar images as points 1, 2, and 3, respectively. The display 12 displays a second superimposed image larger on the list display screen 20a as the second superimposed image includes more similar images. This allows the user to easily find a second superimposed image including many similar images.

Fourth Evaluation Value

The fourth evaluation value is a value by which the importance is evaluated based on whether an image is a captured image captured by the device other than the electronic apparatus 1 (hereinafter, also referred to as a "separate-apparatus-captured image").

The separate-apparatus-captured image is, for example, an image captured by an apparatus owned by a person other than the user of the electronic apparatus 1. The electronic apparatus 1 acquires a separate-apparatus-captured image by communication means such as email. The electronic apparatus 1 is connectable with the apparatus that saves a separate-apparatus-captured image, and acquires the separate-apparatus-captured image from the apparatus. The separate-apparatus-captured image can be regarded as an image having higher importance than that of the image captured by the electronic apparatus 1 for the user of the electronic apparatus 1.

Figure 11:
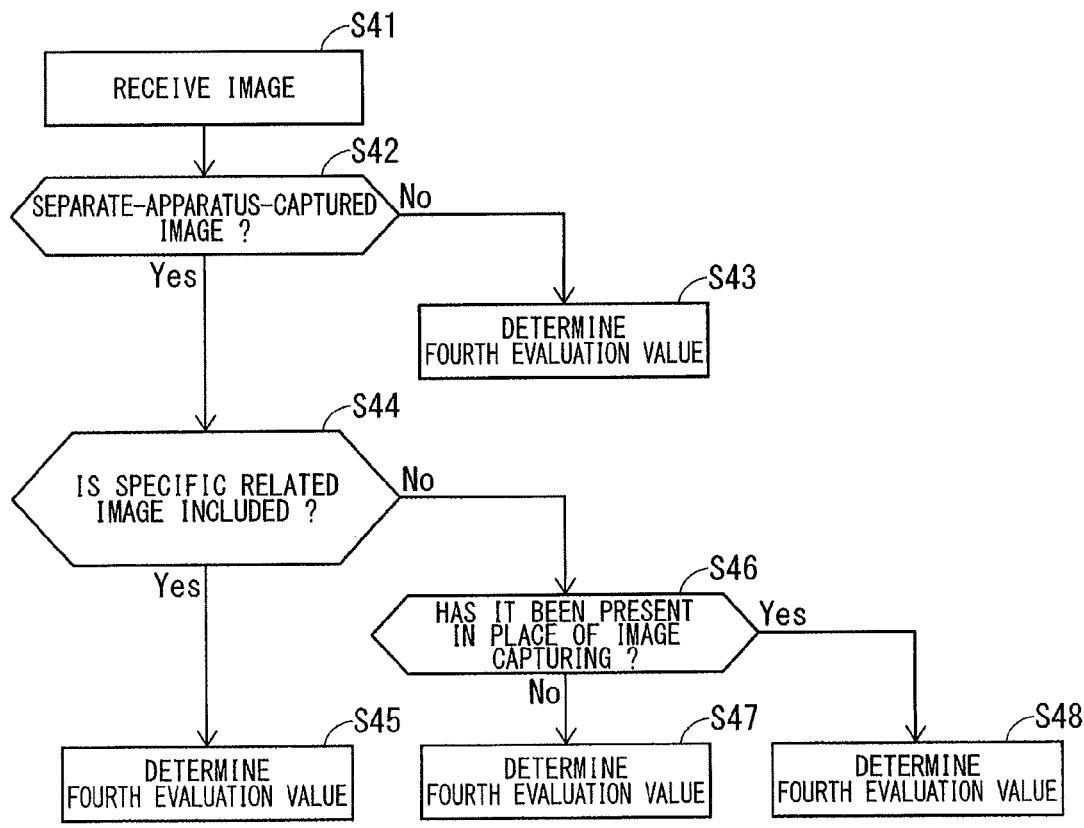
FIG. 11 illustrates a flowchart showing still an example of still another operation of the importance determiner.

FIG. 11 illustrates a flowchart showing an example of the operation in which the importance determiner 110 determines a fourth evaluation value. In Step S41, first, the importance determiner 110 receives an evaluation target image. When the electronic apparatus 1 acquires an image from an external apparatus by email or the like, the image is input to the importance determiner 110 as an evaluation target image. In Step S42, next, the importance determiner 110 judges whether the evaluation target image is a separate-apparatus-captured image. The importance determiner 110 can judge whether the evaluation target image is a separate-apparatus-captured image based on the information on the type of an image capturing apparatus which is contained in the meta information embedded in the evaluation target image.

When the judgment is negative in Step S42, Step S43 is executed. In Step S43, the importance determiner 110 determines the fourth evaluation value of the evaluation target image.

The importance determiner 110 sets the importance of the separate-apparatus-captured image high compared with the image captured by the electronic apparatus 1. The fourth evaluation value is determined from, for example, points 1 to 3. In Step S43, the importance determiner 110 sets the fourth evaluation value of the evaluation target image, which is not a separate-apparatus-captured image, as point 0. Meanwhile, the fourth evaluation value of the evaluation target image, which has been judged as a separate-apparatus-captured image in Step S42, is any one of points 1 to 3 through the process of Steps S44 to S48. The importance becomes higher as the fourth evaluation value is greater, and thus, the display 12 displays the separate-apparatus-captured image larger than the other images on the list display screen 20a. This allows the user to easily find a separate-apparatus-captured image having higher importance for the user.

When the judgment is affirmative in Step S42, Step S44 is executed. In Step S44, the importance determiner 110 judges whether a plurality of images in the storage 103 which are displayed by the display 12 include a captured image (hereinafter, also referred to as a specific related image) captured, on the date and time close to the date and time when the evaluation target image has been captured, by the electronic apparatus 1 in the place in which an evaluation target image has been captured. The importance determiner 110 can judge whether a specific related image is included by comparing the information on the type of an image capturing apparatus, the information on the date and time of image capturing, and the information on the location of image capturing that are contained in the meta information embedded in each of a plurality of images displayed by the display 12 with the information on the type of an image capturing apparatus, the information on the date and time of image capturing, and the information on the location of image capturing that are contained in the meta information embedded in an evaluation target image. The importance determiner 110 sets the image captured within a predetermined period including the date and time when an evaluation target image has been captured as an image captured on the date and time close to those when the evaluation target image has been captured.

When the judgement is affirmative in Step S44, Step S45 is executed. In Step S45, the importance determiner 110 determines a fourth evaluation value of the evaluation target image. In Step S45, the importance determiner 110 sets the fourth evaluation value of the evaluation target image, whose specific related image has been judged to be present, low. The separate-apparatus-captured image, on which affirmative judgment has been made in Step S44, can be regarded as an image having lower importance for the user because the user has also captured an image with the electronic apparatus 1 in the place of image capturing when the separate-apparatus-captured image has been captured. In Step S45, the importance determiner 110 sets, for example, the fourth evaluation value of the target image as point 1.

When the judgment is negative in Step S44, meanwhile, Step S46 is executed. In Step S46, the importance determiner 110 judges whether the user has been in the place in which a separate-apparatus-captured image (evaluation target image) has been captured when the separate-apparatus-captured image has been captured. In other words, the importance determiner 110 judges whether the electronic apparatus 1 has been in the place in which a separate-apparatus-captured image has been captured when the separate-apparatus-captured image has been captured. In one embodiment, the electronic apparatus 1 stores the information on the current date and the information on the current time acquired by the timer 17 and the information on the location of the electronic apparatus 1 acquired by the location information acquirer 16 in the storage 103 every predetermined time. This allows the electronic apparatus 1 to know when and where it has been present. In Step S46, the importance determiner 110 compares the information on date, the information on time, and the information on the location of the electronic apparatus 1 that have been acquired every predetermined time with the information on the date and time and the information on the location when and where a separate-apparatus-captured image (evaluation target image) has been captured, thereby judging whether the electronic apparatus 1 has been present in the place in which the separate-apparatus-captured image has been captured when the separate-apparatus-captured image has been captured.

When the judgment is negative in Step S46, Step S47 is executed. In Step S47, the importance determiner 110 determines a fourth evaluation value of the evaluation target image. When the judgment is affirmative in Step S46, meanwhile, Step S48 is executed. In Step S48, the importance determiner 110 determines the fourth evaluation value of the evaluation target image.

The separate-apparatus-captured image (evaluation target image) on which affirmative judgment has been made in Step S46 can be regarded as an image having higher importance for the user because the user has captured no image with the electronic apparatus 1 even though the user has been in the place of image capturing when the separate-apparatus-captured image has been captured. In Step S48, accordingly, the importance determiner 110 sets the fourth evaluation value of the evaluation target image as point 3. In Step S47, the importance determiner 110 sets the fourth evaluation value of the evaluation target image as point 2.

In this manner, the importance determiner 110 determines the first to fourth evaluation values of each of the images displayed by the display 12 in the list display mode. The importance determiner 110 then sets, for each of the images displayed by the display 12 in the list display mode, the sum of the first to fourth evaluation values of the image as the importance of the image. The importance of an image determined by the importance determiner 110 is any one of points 0 to 12.

The criteria and points of judgment when each evaluation value is determined are not limited to the above. For example, when an image includes a specific person such as his/her child, the importance of the image may be evaluated as being high using a face recognition technique or any other technique. Alternatively, a dynamic image may be evaluated as having high importance or may be evaluated as having high importance when the playback of the dynamic image (viewing by a user) has not completed, that is, when the slider bar 22b is between the starting point and the ending point of the seek bar 22a.

Display Size Determiner

The display size determiner 140 determines, based on the importance of an image determined by the importance determiner 110, the display size of the image in the list display screen 20a. The display size determiner 140 increases the display size of an image as the importance of the image is higher. In one embodiment, the display sizes of the images displayed by the display 12 in the list display mode are classified into five display sizes based on the importance of each image. For example, the display 12 displays the images having the importance of points 0 to 2 in a first display size, the images having the importance of points 3 and 4 in a second display size, the images having the importance of points 5 and 6 in a third display size, the images having the importance of points 7 and 8 in a fourth display size, and the images having the importance of point 9 or more in a fifth display size.

The image of the first display size has, for example, a square shape. If the length-to-width dimensions of the first display size are defined to be 1×1, the length-to-width dimensions of the second, fourth, and fifth display sizes are 2×2, 3×3, and 4×4, respectively. The length-to-width dimensions of the third display size are 2×3 or 3×2 in accordance with the length-width ratio of an image.

In the illustration of FIG. 6, the images 21*b*, 21*d* to 21*j*, 21*l*, and 21*m* are displayed in the first display size (dimensions of 1×1), the images 21*a* and 21*c* are displayed in the second display size (dimensions of 2×2), and the image 21*k* is displayed in the laterally-long third display size (dimensions of 2×3).

Figure 12:
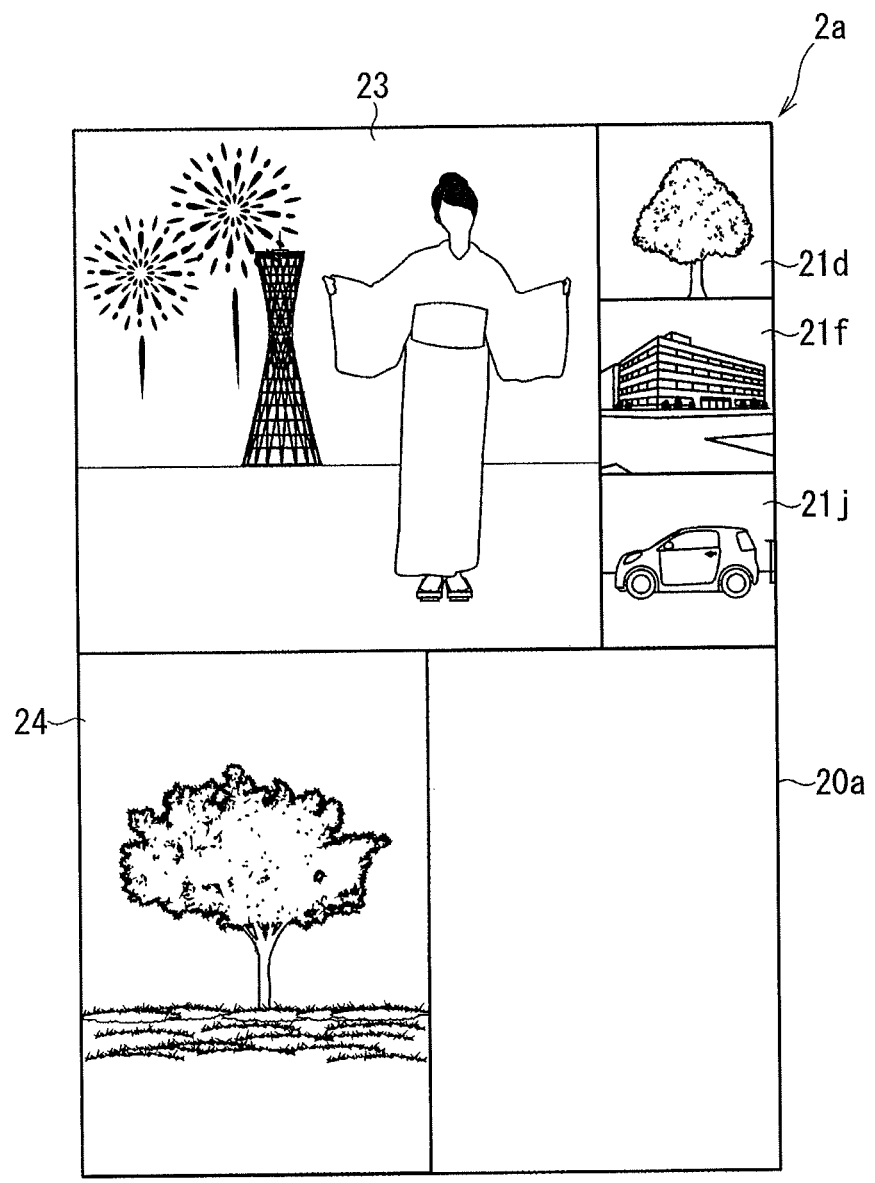
FIG. 12 schematically illustrates an example of the list display screen.
Figure 13:
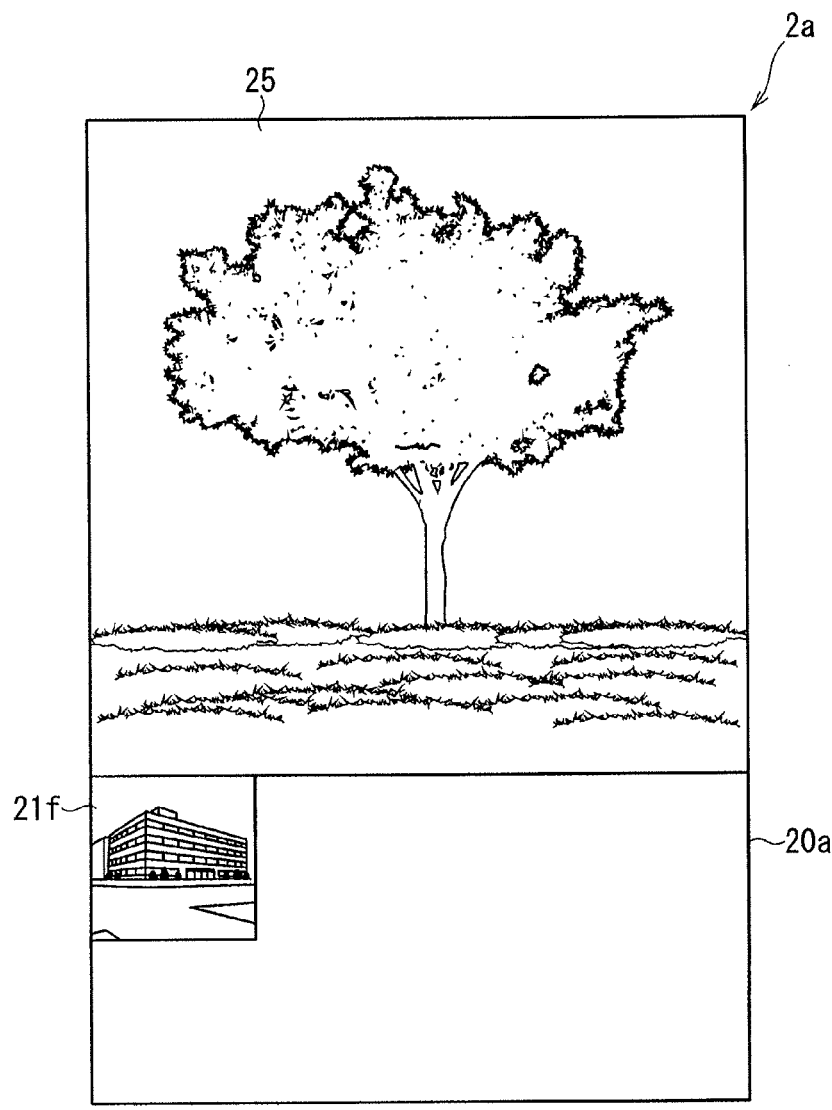
FIG. 13 schematically illustrates another example of the list display screen.

FIGS. 12 and 13 schematically illustrate examples of the list display screen 20*a*. In the illustration of FIG. 12, the images 21*d*, 21*f*, and 21*j* of the first display size (dimensions of 1×1), the image 23 in the fourth display size (dimensions of 3×3), and the image 24 of the longitudinally-long third display size (dimensions of 3×2) are displayed. In the illustration of FIG. 13, the image 21*f* of the first display size (dimensions of 1×1) and an image 25 of the fifth display size (dimensions of 4×4) are displayed.

Although images are displayed in the entire display area 2*a* in the illustration of FIG. 6 due to many images to be displayed, with few images to be displayed, images may be displayed in part of the display area 2*a* as illustrated in FIGS. 12 and 13.

Arrangement Determiner

The arrangement determiner 150 determines the arrangements of a plurality of images in the list display screen 20*a*. The arrangement determiner 150 determines the arrangements of a plurality of images in the list display screen 20*a* in such a manner that the plurality of images are arranged with the smallest possible gap.

Figure 14:
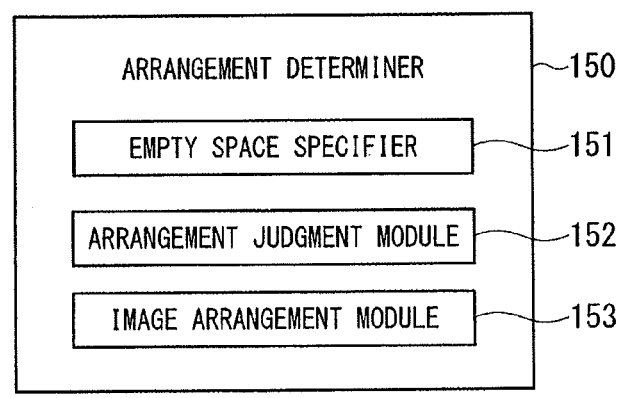
FIG. 14 illustrates an example of a configuration of an arrangement determiner.

FIG. 14 illustrates an example of the configuration of the arrangement determiner 150. The arrangement determiner 150 includes an empty block specifier 151, an arrangement judgment module 152, and an image arrangement module 153.

Figure 15:
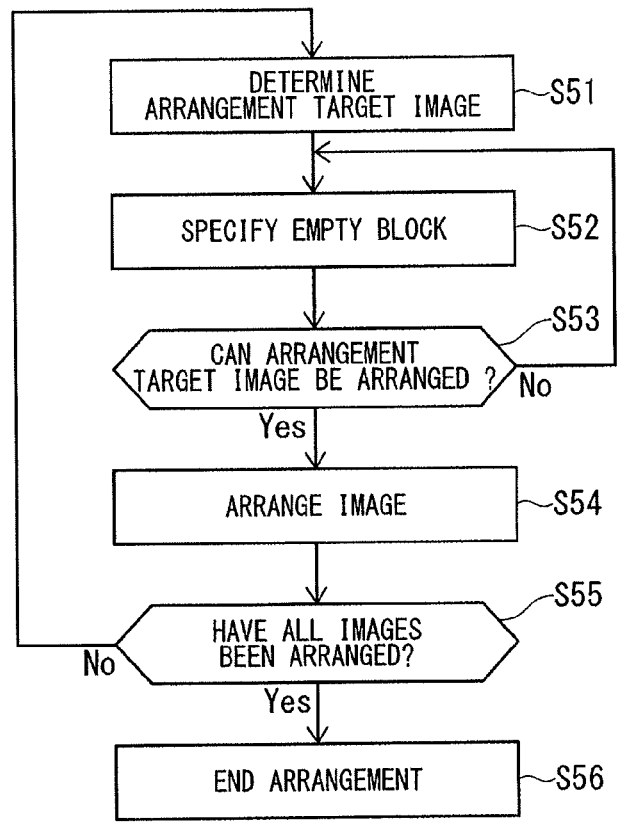
FIG. 15 illustrates a flowchart showing an example of an operation of the arrangement determiner.

FIG. 15 illustrates a flowchart showing an example of the operation of the arrangement determiner 150. FIGS. 16 to 20 illustrate the operation of the arrangement determiner 150. Hereinafter, with reference to FIGS. 16 to 20, the operation of the arrangement determiner 150 will be described in detail along the flowchart illustrated in FIG. 15. The case in which a plurality of images are arranged in the list display screen 20*a* as in FIG. 6 will be described below as an example.

In Step S51, first, the arrangement determiner 150 determines an arrangement target image from a plurality of images in the storage 103. Herein, first, the image 21*a* is determined as an arrangement target image. The arrangement determiner 150 sets a plurality of images displayed on the list display screen 20*a* as arrangement target images in, for example, a chronological order of the date and time of image capturing.

In Steps S52 to S54, next, the arrangement determiner 150 executes the processing of arranging the arrangement target image in the list display screen 20*a*.

Figure 16:
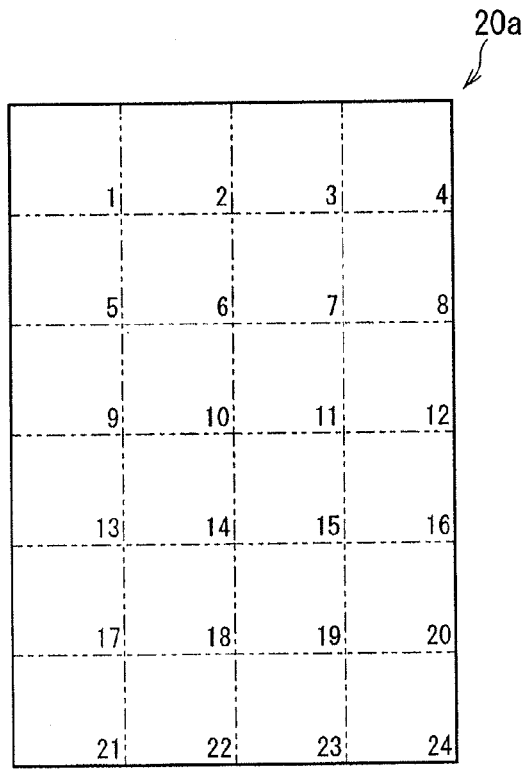
FIGS. 16 to 20 illustrate the operation of the arrangement determiner.

As illustrated in FIG. 16, the list display screen 20*a* is divided into a plurality of blocks in matrix which are used as the reference when the arrangement determiner 150 arranges an image. In the illustration of FIG. 16, boundaries between the blocks are indicated by chain double-dashed lines for description. In the illustration of FIG. 16, blocks of six rows by four columns are shown. The size of each block is equal to the first display size. A number in the lower right-hand corner is a number for explaining the position of the block. Numbers are added to the respective blocks sequentially along the raster direction starting from the upper left block. In FIGS. 16 to 20, the blocks with "1" to "24" are referred to as blocks B1 to B24, respectively.

In Step S52, in the list display screen 20*a*, the empty block specifier 151 specifies an empty block in which no image is arranged and which appears first when a plurality of blocks are viewed sequentially along the raster direction starting from the upper left block. The processing in Step S52 may be referred to as first processing. In the illustration of FIG. 16, no image is arranged in the list display screen 20*a*, and thus, the empty block specifier 151 specifies the block B1 as an empty block.

In Step S53, the arrangement judgment module 152 judges whether an arrangement target image can be arranged in the empty block specified in Step S52. The processing in Step S53 may be referred to as second processing. In the second processing, the arrangement judgment module 152 judges whether the arrangement target image can be arranged in such a manner that the upper left corner of the empty block coincides with the upper left corner of the arrangement target image. When the judgment is affirmative in Step S53, Step S54 is executed. In Step S54, the image arrangement module 153 arranges the arrangement target image in such a manner that the upper left corner of the empty block specified in Step S52 coincides with the upper left corner of the arrangement target image. The processing in Step S54 may be referred to as third processing.

Figure 17:
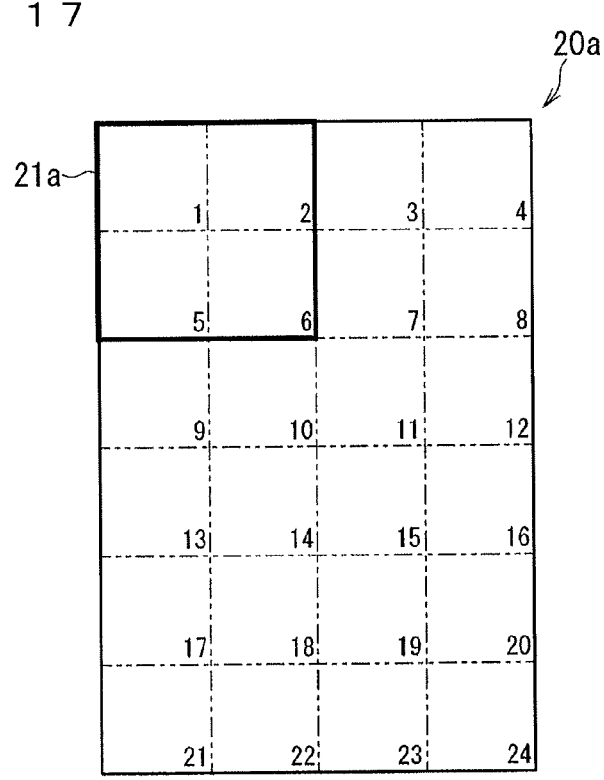

In one example, in Step S53, the arrangement judgment module 152 judges whether the image 21*a* can be arranged in the block B1. The image 21*a* is of the second display size (dimensions of 2×2), and thus, the arrangement judgment module 152 judges whether there are empty blocks of 2×2. When the image 21*a* is arranged in such a manner that the upper left corner of the block B1 coincides with the upper left corner of the image 21*a*, the arrangement judgment module 152 judges whether the blocks B1, B2, B5, and B6 are empty. No image is arranged in these blocks in the illustration of FIG. 16, and thus, the arrangement judgment module 152 judges that the image 21*a* can be arranged in these blocks. As illustrated in FIG. 17, then, the image arrangement module 153 arranges the image 21*a* in the blocks B1, B2, B5, and B6.

In Step S55, next, the arrangement determiner 150 judges whether all the images to be displayed on the list display screen 20*a* have been arranged. When the judgment is affirmative in Step S55, Step S56 is executed. In Step S56, the arrangement determiner 150 ends the processing of arranging an image. When the judgment is negative in Step S55, meanwhile, Step S51 is executed again. That is, Steps S52 to S55 are repeatedly executed until all the images to be displayed on the list display screen 20*a* are arranged.

Figure 18:
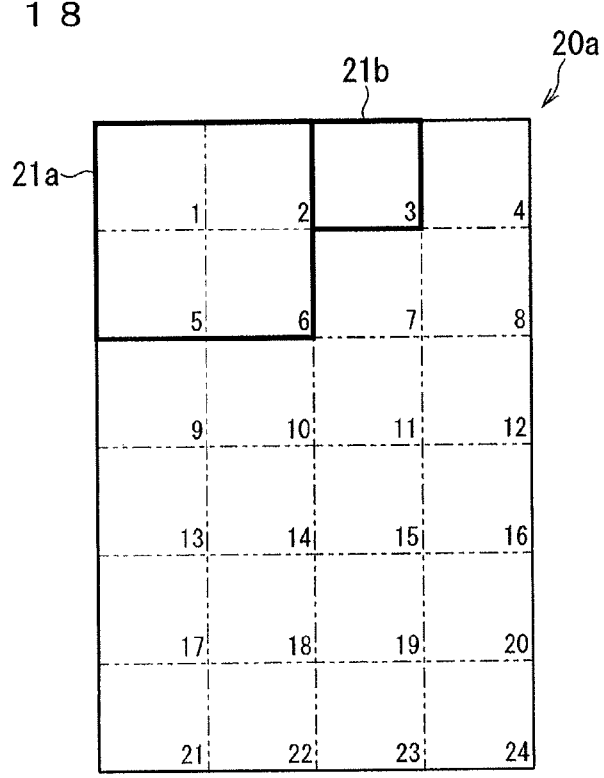

In one example, the image 21*b* is determined as an arrangement target image in Step S51 executed in the second round. The image 21*b* is of the first display size (dimensions of 1×1). In Steps S52 to S55, then, the arrangement determiner 150 executes the processing for determining the arrangement of the image 21*b*. As illustrated in FIG. 17, with the image 21*a* arranged, the empty block specifier 151 specifies the block B3 as an empty block. As illustrated in FIG. 18, then, the image arrangement module 153 arranges the image 21*b* in the block B3.

In Step S51 executed in the third round, the image 21*c* is determined as an arrangement target image. The image 21*c* is of the second display size (dimensions of 2×2). In Steps S52 to S55, then, the arrangement determiner 150 executes the processing for determining the arrangement of the image 21c.

With the images 21a and 21b arranged as illustrated in FIG. 18, the empty block specifier 151 specifies the block B4 as an empty block. The arrangement judgment module 152 then judges whether the image 21c can be arranged in such a manner that the upper left corner of the block B4 coincides with the upper left corner of the image 21c. Arranging the image 21c in this manner requires empty blocks of 2×2. In the illustration of FIG. 18, there are no empty blocks of 2×2 where the block B4 is the upper left block, and thus, in Step S53, the arrangement judgment module 152 judges that the image 21c cannot be arranged.

When the judgment is negative in Step S53, Step S52 is executed again. In Step S52 in the second and subsequent rounds for the same arrangement target image, the empty block specifier 151 specifies an empty block that appears first when a plurality of blocks except for the specified empty blocks are viewed sequentially along the raster direction starting from the upper left block. The empty block specifier 151 sequentially specifies the next empty block until it is judged in Step S53 that an arrangement target image can be arranged.

Figure 19:
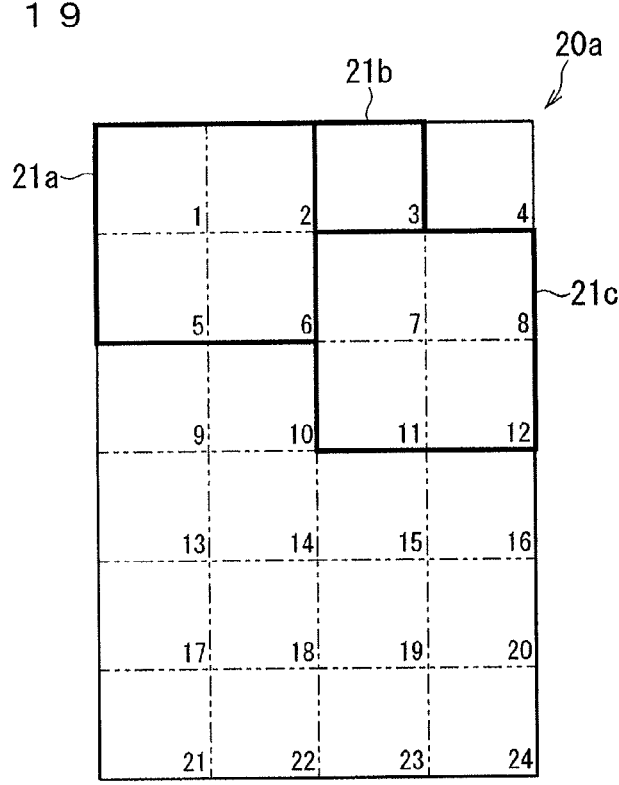

In the illustration of FIG. 18, the empty block specifier 151 specifies the block B7 as an empty block other than the block B4. The arrangement judgment module 152 then judges whether the image 21c can be arranged in such a manner that the upper left corner of the block B7 coincides with the upper left corner of the image 21c. In the illustration of FIG. 18, blocks of 2×2, composed of the blocks B7, B8, B11, and B12, are empty, and thus, as illustrated in FIG. 19, the image arrangement module 153 arranges the image 21c in the blocks B7, B8, B11, and B12.

Figure 20:
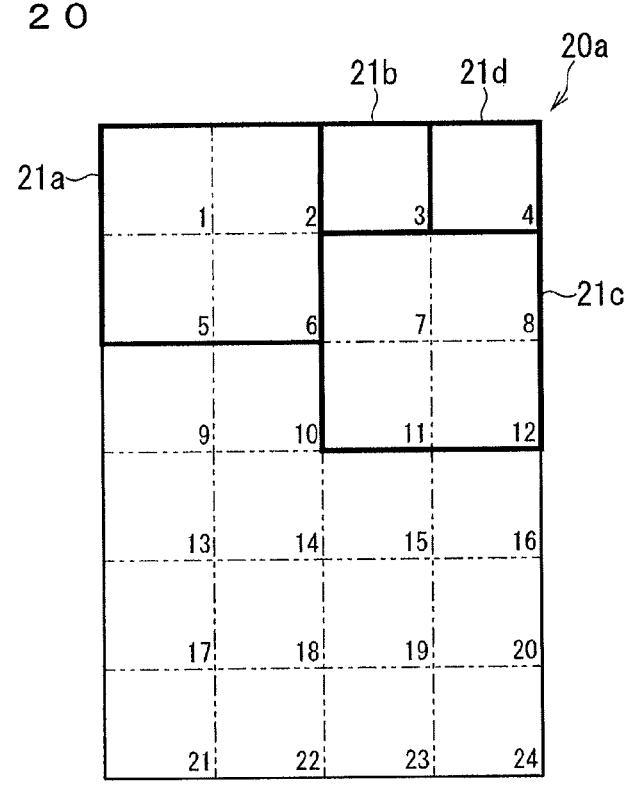

In Step S51 executed in the fourth round, the image 21d is determined as an arrangement target image. The image 21d is of the first display size (dimensions of 1×1). With the images 21a to 21c arranged as illustrated in FIG. 19, in Step S52, the empty block specifier 151 specifies the block B4 as an empty block. Then, it is judged in Step S53 that the arrangement target image can be arranged, and as illustrated in FIG. 20, in Step S54, the image arrangement module 153 arranges the image 21d in the block B4.

Hereinafter, the arrangement determiner 150 operates similarly, thereby determining the arrangements of all the images to be displayed on the list display screen 20a. The display 12 displays the list display screen 20a including a plurality of images arranged in accordance with the arrangements determined by the arrangement determiner 150.

Through the operation of the arrangement determiner 150 in this manner, a plurality of images of different display sizes can be arranged with the smallest possible gap on the list display screen 20a. The dimensions of the list display screen 20a can accordingly be reduced. This allows the user to more easily specify an important image from a plurality of images in the list display screen 20a.

The description above is applicable to the case in which all of a plurality of images stored in the storage 103 are displayed alongside each other in a chronological order of the date and time of image capturing as well as to the case where part of a plurality of images stored in the storage 103 are displayed alongside each other in a chronological order of the date and time of image capturing, for example, the case where images are arranged every month or date of image capturing.

Although the description has been made on the case where the technology according to the embodiments of the present disclosure is applied to a mobile phone, the technology according to the embodiments of the present disclosure is applicable to any electronic apparatus as long as it includes a display that displays a plurality of images alongside each other. For example, the technology according to the embodiments of the present disclosure is also applicable to personal computers, tablet terminals, or wearable electronic apparatuses worn on the arm or the like.

While the electronic apparatus 1 has been shown and described in detail, the foregoing description is in all aspects illustrative and not restrictive. Also, the variations are applicable in combination as long as they are consistent with each other. It is therefore understood that numerous modifications and variations can be devised without departing from the scope of the present disclosure.

The invention claimed is:

1. An electronic apparatus comprising:
    a display comprising a first display mode in which a plurality of images are displayed alongside each other; and
    at least one processor that determines an importance of an image and determines a display size of each of the plurality of images,
    wherein the at least one processor increases the display size of an image as the importance of the image is higher, and wherein the at least one processor performs a first judgment of whether a target image whose importance is to be determined is a first captured image captured by an apparatus other than the electronic apparatus and, when the target image is the first captured image, the at least one processor performs a second judgment of whether the electronic apparatus is in a place in which the target image was captured and, based on a result of the second judgment and the result of the first judgment, determines the importance of the target image.

2. The electronic apparatus according to claim 1, wherein the display in the first display mode displays a first image, which is a continuously shot image group captured in one continuous shooting, and the first image comprise a plurality of continuously shot images that are superimposed so as to overlap each other,
    in each of the plurality of continuously shot images other than a topmost image, a portion covered with the other continuously shot images is invisible at a forefront of the first image, and
    in each of the plurality of continuously shot images, an outline of a portion covered with none of the other continuously shot images is visible at the forefront of the first image.

3. The electronic apparatus according to claim 2, wherein the at least one processor judges whether a target image whose importance is to be determined is the first image and, based on a judgment result, determines the importance of the target image.

4. The electronic apparatus according to claim 3, wherein when the target image is the first image, the at least one processor determines the importance of the target image based on the number of continuously shot images.

5. The electronic apparatus according to claim 2, wherein the display displays the first image while sequentially switching a topmost image among the plurality of continuously shot images of the first image.

6. The electronic apparatus according to claim 1, wherein:
    at least one processor specifies, from a plurality of images displayed by the display, a plurality of similar images whose dates and times of image capturing are close to each other and which are similar to each other, the display in the first display mode displays a second image comprising the plurality of similar images that are superimposed so as to overlap each other,
in each of the plurality of similar images other than a topmost similar image, a portion covered with the other similar images is invisible at a forefront of the second image, and
in each of the plurality of similar images, a portion covered with none of the other similar images is visible at the forefront of the second image.

7. The electronic apparatus according to claim 6,
wherein the at least one processor judges whether a target image whose importance is to be determined is the second image and, based on a judgment result, determines the importance of the target image.

8. The electronic apparatus according to claim 7,
wherein when the target image is the second image, the at least one processor determines the importance of the target image based on the number of the plurality of similar images.

9. The electronic apparatus according to claim 6,
wherein the display displays the second image while sequentially switching a topmost image among the plurality of similar images of the second image.

10. The electronic apparatus according to claim 1, wherein:
the display comprises a second display mode in which an image is displayed larger than in the first display mode, and
the at least one processor determines the importance of a target image whose importance is to be determined based on the number of displays or a display time in which the display in the second display mode has displayed the target image.

11. The electronic apparatus according to claim 1,
wherein the at least one processor determines, based on a user evaluation of a target image whose importance is to be determined, importance of the target image.

12. The electronic apparatus according to claim 1,
wherein the display in the first display mode displays a dynamic image while playing back the dynamic image.

13. The electronic apparatus according to claim 1, wherein:
a display screen which is displayed by the display in the first display mode and in which a plurality of images are arranged is divided into a plurality of blocks in matrix,
the at least one processor determines arrangements of a plurality of images in the display screen,
the at least one processor executes, in arranging an arrangement target image in the display screen,
first processing of specifying an empty block that appears first when the plurality of blocks are viewed sequentially along a raster direction starting from an upper left block,
second processing of judging whether the arrangement target image is allowed to be arranged in such a manner that an upper left corner of the empty block coincides with an upper left corner of the arrangement target image, and
third processing of arranging, when judging that the arrangement target image is allowed to be arranged in the second processing, the arrangement target image in such a manner that the upper left corner of the empty block coincides with the upper left corner of the arrangement target image, and
when judging that the arrangement target image is not allowed to be arranged in the second processing, the at least one processor repeatedly executes the first processing and the second processing until the third processing is executed, and in the first processing in second and subsequent rounds, specifies the empty block that appears first when the plurality of blocks except for the specified empty block are viewed along the raster direction starting from an upper left block.

14. A non-transitory storage medium readable by a computer configured to store a control program that controls an electronic apparatus, the storage medium storing the control program configured to cause the electronic apparatus to execute
(a) displaying a plurality of images alongside each other;
(b) determining importance of an image;
(c) determining a display size of each of the plurality of images; and
(d) increasing a display size of an image as the importance of the image is higher, wherein the determining importance of the image comprises performing a first judgment of whether a target image whose importance is to be determined is a first captured image captured by an apparatus other than the electronic apparatus and, when the target image is the first captured image, performing a second judgment of whether the electronic apparatus is in a place in which the target image was captured and, based on a result of the second judgment and the result of the first judgment, determining the importance of the target image.

15. A method for displaying an image, comprising:
(a) displaying a plurality of images alongside each other;
(b) determining importance of an image; and
(c) determining a display size of each of the plurality of images; and
(d) increasing a display size of an image as the importance of the image is higher, wherein the determining importance of the image comprises performing a first judgment of whether a target image whose importance is to be determined is a first captured image captured by an apparatus other than the electronic apparatus and, when the target image is the first captured image, performing a second judgment of whether the electronic apparatus is in a place in which the target image was captured and, based on a result of the second judgment and the result of the first judgment, determining the importance of the target image.

* * * * *